United States Patent [19]
Cumiskey

[11] Patent Number: 5,245,783
[45] Date of Patent: Sep. 21, 1993

[54] FISHING JIG

[76] Inventor: Dennis M. Cumiskey, 297 E. Shore Trail, Sparta, N.J. 07871

[21] Appl. No.: 957,518

[22] Filed: Oct. 6, 1992

[51] Int. Cl.$^5$ ............................................. A01K 85/00
[52] U.S. Cl. ................................................. 43/42.37
[58] Field of Search ................... 43/42.37, 42.39, 42.4, 43/42.53, 42.43, 42.32, 42.33, 42.38

[56] References Cited

U.S. PATENT DOCUMENTS

| | | |
|---|---|---|
| 231,912 | 9/1880 | Irgens . |
| 2,121,114 | 6/1938 | Beck . |
| 2,163,666 | 6/1939 | Carter et al. . |
| 2,241,941 | 5/1941 | Bates . |
| 2,333,484 | 11/1943 | Miles . |
| 2,335,322 | 11/1943 | Taylor . |
| 2,439,123 | 4/1948 | Bell . |
| 2,511,117 | 6/1950 | Loeb ............................... 43/42.37 |
| 2,511,117 | 6/1950 | Loeb . |
| 2,737,750 | 3/1956 | Pierce et al. . |
| 2,787,858 | 4/1957 | Best . |
| 2,938,294 | 5/1960 | Bachmann . |
| 3,087,272 | 4/1963 | McClanahan . |
| 3,122,853 | 3/1964 | Koonz et al. . |
| 3,269,050 | 8/1966 | Garwood . |
| 3,611,614 | 10/1971 | Ward . |
| 3,750,321 | 8/1973 | McClellan ................... 43/42.37 |
| 3,750,323 | 8/1973 | Weis ............................ 43/42.37 |
| 3,863,378 | 2/1975 | Walker ........................ 43/42.37 |
| 3,909,974 | 10/1975 | Kent ............................ 43/42.37 |
| 4,123,870 | 11/1978 | Wiskirchen ................. 43/42.37 |
| 4,663,880 | 5/1987 | Grobl . |
| 4,738,047 | 4/1988 | Ryan ........................... 43/42.37 |
| 4,888,904 | 12/1989 | Douglas, Jr. . |
| 4,922,646 | 5/1990 | Basgal . |

Primary Examiner—Kurt C. Rowan
Attorney, Agent, or Firm—Lerner, David, Littenberg, Krumholz & Mentlik

[57] ABSTRACT

A fishing jig and methods of manufacturing a jig. The fishing jig comprises a shaft and a hook formed at one end of the shaft. A translucent bead is connected at an opposite end of the shaft so as to form a head thereon. An eyelet is connected to the second end of the shaft and is arranged adjacent to the translucent head. In a method of manufacturing a fishing jig, a passageway is cut within a translucent bead so that a shaft of a jig can be placed within the bead so that the bead forms a translucent head of the jig. The translucent head is then secured to the shaft by filling the passageway with an adhesive filler, preferably a transparent adhesive.

15 Claims, 3 Drawing Sheets

FISHING JIG

FIELD OF THE INVENTION

The present invention relates to fishing jigs and methods of manufacturing same.

BACKGROUND OF THE INVENTION

It has long been understood that the use of fishing lures to attract fish is a preferred method of fishing for sportsmen and other small-time fisherman. This has led to tackle shops and mail-order catalogs flooding the commercial marketplace with many different types of fishing lures. Thus, it is often difficult for sportsmen to select which lure is the most desirable for a particular situation. A lure's effectiveness in catching fish is often the single most important factor considered by fisherman in selecting which type of lure to use. Thus, it is desirable for a lure to have a high degree of attractiveness for catching fish.

As further defined below, the term "fishing jig" pertains to a particular type of fishing lure having a shaft with a bead formed at the head thereof and a hook arranged at the opposite end of the shaft with respect to the head. In known prior art fishing jigs the head generally comprises a lead bead. Additionally, prior art fishing jigs comprising opaque glass heads are also commonly used. Still other prior art devices disclose fishing lures having a glass body centrally arranged on the shaft thereof. These lures are not true fishing "jigs" since they do not have a bead formed at the head of the shaft.

Accordingly, the prior art is replete with fishing jigs and other fishing lures for attracting fish to same. The crowded art is indicative of the great effort which has been expended by inventors over the years who have hoped to develop a lure having features which are more attractive to fish than other known lures. Notwithstanding this great effort to develop such a device, the structure and operation of prior art fishing jigs have various shortcomings which have been surmounted by the present invention.

Fishing jigs have been a favorite type of lure among sportsmen for many years. Thus, there is a need for a fishing jig that will attract more fish than known jigs. In efforts to develop a more attractive jig, inventors have used various types of attachments such as feathers, streamers, and the like. All known fishing jigs that use the foregoing types of attachments, include an opaque bead arranged at the head of the jig and are therefore similar in appearance to each other, especially when they are under water. Thus, most of the prior art jigs have approximately the same degree of effectiveness in catching fish.

It is evident from the existence of the drawbacks in prior art fishing jigs, that there has been a considerable need for an improved fishing jig which is effective, inexpensive to manufacture and will attract more fish than has heretofore been possible. Furthermore, there has been an unsolved need for an improved fishing jig which takes maximum advantage of sunlight in water where little light is available.

The present invention addresses the aforementioned needs of the prior art and will thus benefit all fisherman who have a need for a fishing jig that will attract more fish than has heretofore been possible through the use of known jigs.

SUMMARY AND OBJECTS OF THE INVENTION

One aspect of the present invention provides a fishing jig comprising a shaft having a first end and a second end. The fishing jig includes a hook formed at the first end of the shaft and a translucent bead fixedly connected about the second end of the shaft so as to form a head thereon. An eyelet is connected to the second end of the shaft and is arranged adjacent the translucent head so that substantially all of the weight of the jig is disposed about the eyelet.

In one preferred embodiment, the second end of the shaft is L-shaped and is arranged within the bead at the head of the jig. It is also preferable for the translucent bead to include a groove wherein the L-shaped second end of the shaft is arranged within the groove so that the eyelet is arranged adjacent the bead.

In another preferred embodiment, the translucent bead is made of glass and is filled with an adhesive gap filler to secure the shaft therein. It is desirable for the adhesive gap filler to have a translucent composition.

In another preferred embodiment, the fishing jig further comprises weed guard means for preventing the hook from getting caught in underwater plant life or other underwater obstacles. Desirably, the weed guard means comprises at least one elongate wire arranged to extend between the eyelet and the hook. Still another aspect of the present invention provides bait holder means for retaining bait in a location remote from the hook.

According to the method of the present invention, an elongate shaft having a hook and an eyelet thereon is provided. The shaft preferably includes a head end and the eyelet is preferably arranged remote from the hook at the head end of the shaft. A translucent bead is also provided and a sized and shaped passageway is cut into the bead so that the passageway can accept the shaft therein. The shaft is then placed in the groove so that the bead is arranged at the head of the jig. The groove is then filled with an adhesive filler and the filler is permitted to cure so that the shaft is secured therein.

In one preferred method, the step of cutting a groove in the bead comprises the step of drilling a hole therethrough and the step of placing the shaft in the groove comprises the step of sliding the shaft and the eyelet through the hole in the bead until the eyelet is arranged outside of the bead and is adjacent thereto.

Another preferred method of manufacturing the fishing jig of the present invention includes the steps of attaching a weed guard to the bead at a location adjacent the eyelet and attaching the weed guard to the hook so that the weed guard extends thereacross. It is preferable according to another preferred method to attach a barbed wire to the eyelet so that the barbed wire forms a bait holder at a location remote from the hook.

Accordingly, it is an object of the present invention to provide a fishing jig which includes a translucent head so that sunlight is permitted to pass therethrough when immersed in a body of water in a manner that is attractive to fish.

It is another object of the present invention to provide a fishing jig which can be commercially manufactured at a low cost.

It is another object of the present invention to provide a fishing jig having a translucent head which produces attractive sounds to fish when the head comes in contact with hard objects under water.

It is yet another object of the present invention to provide a new method of manufacturing a fishing jig having a translucent head which will produce advantageous results in the commercial marketplace.

These and other objects of the present invention will be more clearly understood when read in conjunction with the detailed description and the accompanying drawings which follow.

DETAILED DESCRIPTION OF THE PREFERRED EMBODIMENTS

According to the preferred embodiments of the present invention, a fishing generally designated 10 is clearly disclosed in FIGS. 1-8. As discussed above, it should be understood that the term "fishing jig" will be used throughout this application to refer to a specific type of fishing lure having a hook formed on one end of a shaft and a bead defining a head arranged on a second end of the shaft so that substantially all of the weight of the device is disposed about an eyelet which is arranged adjacent the head of the jig.

Figure 1:
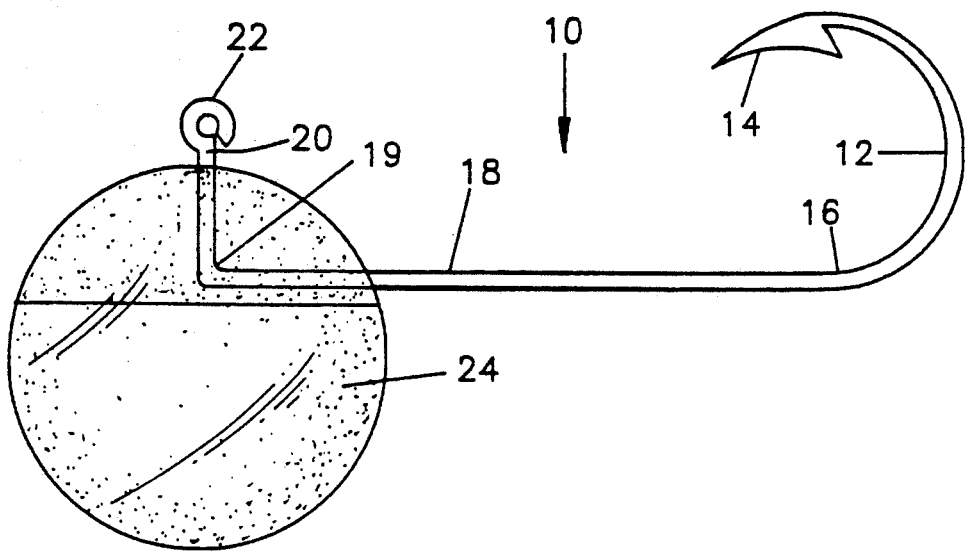
FIG. 1 is a side view of a fishing jig according to one embodiment of the present invention.
Figure 2:
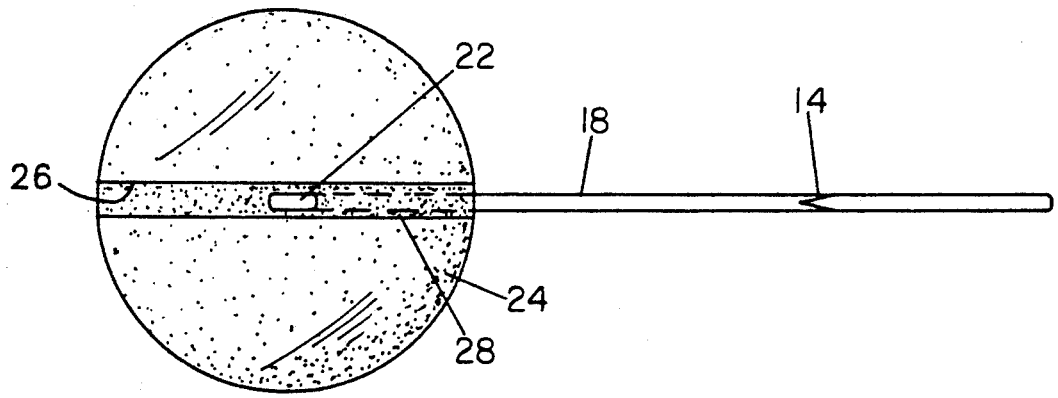
FIG. 2 is a top plan view of the fishing jig shown in FIG. 1.

As clearly shown in FIGS. 1 and 2, the fishing jig 10 comprises a shaft 18 having a first end 16 and a second end 20. The shaft 18 is preferably made of a material having a density greater than that of water and having a high ability to withstand deformation due to external forces. The shaft 18 also has a high ability to withstand decomposition due to oxidation. Many different materials can be used to satisfy the foregoing requirements. However, stainless steel is one particularly preferred material. In a preferred embodiment, the hook 12 is formed from the second end 16 of the shaft and includes an arcuate portion 12 and a barbed portion 14 which defines a hook point.

The second end 20 of the shaft 14 is arranged remote from the location of the first end 16. In the preferred embodiments of the present invention, as shown in FIGS. 1-4, the second end 20 of the shaft 18 includes an L-shaped area 19. Although some of the preferred embodiments of the present invention disclose the L-shaped area 19 as being arranged so that the shaft 18 forms a 90° angle, it should be appreciated that this angle may be varied from 0°-180°, while still remaining within the spirit of the present invention.

The fishing jig 10 of the present invention comprises a head 24 in the form of a bead arranged about the second end 20 of the shaft 18. In this regard, the bead 24 preferably comprises a translucent material having a density significantly greater than water and which is virtually corrosion resistant. Glass is a preferred material for the bead 24 since it includes the foregoing characteristics. However, other translucent materials including plastics such as Plexiglass and the like, can be used instead of glass in accordance with the preferred embodiments of the present invention. When these alternate materials are used, an additional source of weight can be attached to the jig or the associated fishing line to aid the hook in remaining underwater.

As clearly shown in FIGS. 1 and 2, the L-shaped portion 19 of the shaft 18 is precisely received within the groove 26 in the translucent head 24. A translucent glue-like material 28 (hereinafter referred to as "adhesive gap filler") such as epoxies, gums, rubber and other adhesive resins which have suitable curing characteristics and are water-insoluble is used to secure the L-shaped portion 19 of the shaft 18 within the groove 26. This feature of the present invention can best be appreciated with reference to FIGS. 2, 4 and 8.

In a preferred embodiment, the groove 26 extends approximately halfway through the translucent head 24 so that the shaft 18 can be medially mounted therein. However, the precise depth of the groove 26 can vary from entirely through the translucent bead 24 to barely below the surface thereof. It is preferable for the adhesive gap filler 28 to fill the total volume of space within the groove 26 up to the outer circumference of the translucent bead 24. However, the amount of adhesive gap filler 28 can vary so long as a sufficient amount is provided to securely anchor the shaft 18 in the groove 26. Most preferably, the adhesive gap filler 28 comprises a translucent material so that a maximum amount of sunlight can shine through the head 24 of the jig 10 when the jig is immersed in water. However, in less preferable alternate embodiments, the adhesive gap filler 28 may comprise an opaque composition.

An eyelet 22 is connected to the second end 20 of the shaft 18, and is preferably integral therewith, at a location adjacent the translucent head 24. As can best be appreciated with reference to FIGS. 1, 3 and 5, the eyelet 22 is sized and shaped to permit a fishing line to be attached thereto so that the jig can be suspended in a body of water and reeled in at the desired time. The eyelet 22 preferably has a circular shape; however, it may also comprise a variety of other shapes which will permit a fishing line to be attached thereto.

Although several preferred embodiments of the present invention are described in this application, it should be appreciated that in each of the preferred embodiments, most of the weight of the jig is arranged in the vicinity of the eyelet 22. This feature of the preferred embodiments is accomplished through the existence of the translucent head 24 which, as discussed hereinabove, is arranged substantially adjacent the eyelet 22.

In another preferred embodiment, the jig 10 further includes formed wire 30 which extends from the groove 26 adjacent the eyelet 22 of the shaft to the barb 14 of the hook 12 to form a weed guard therebetween. This feature of the present invention can best be appreciated with reference to FIGS. 3 and 4. In an alternate preferred embodiment, the fishing jig 10 may also comprise an additional wire 31 which is attached at one end to the eyelet 22 and which has a barb 32 for securing bait thereon. The barb 32 is arranged between the eyelet 22 and the hook 12. This feature of the present invention is also clearly illustrated in FIGS. 3 and 4. The weed guard 30 effectively reduces the risk that the hook point 14 will become entangled with underwater plant life or other underwater obstacles. The bait holder barb 32 can effectively hold bait or dressing as an additional means for attracting fish to the jig 10 of the present invention.

Figure 3:
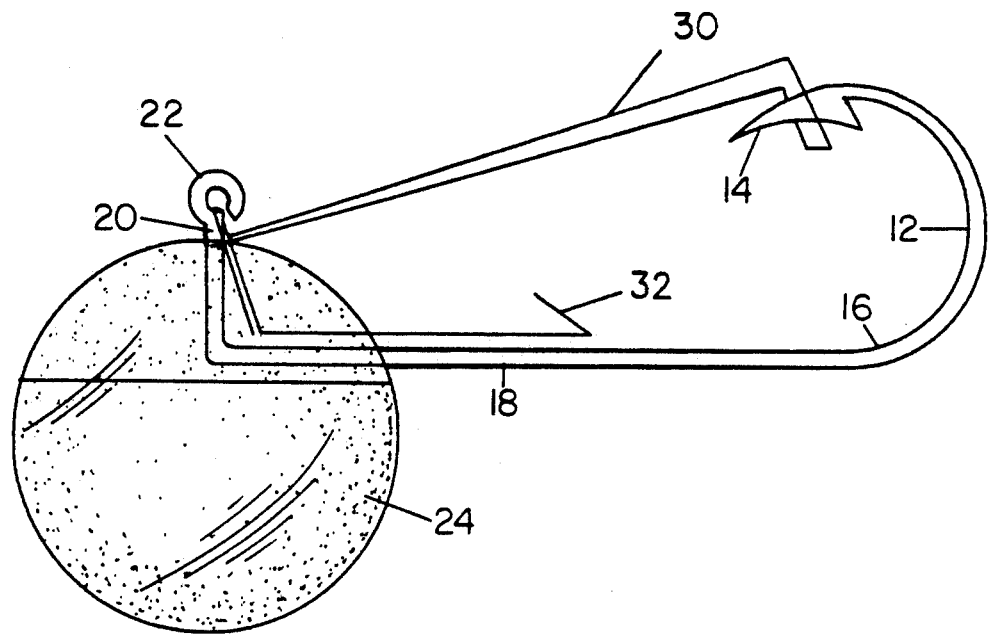
FIG. 3 is a side view of a fishing jig according to a second embodiment of the present invention.
Figure 4:
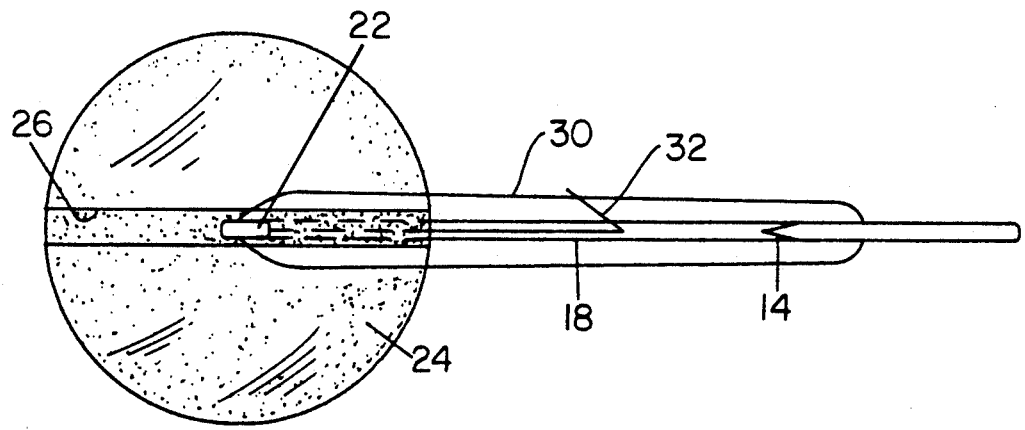
FIG. 4 is a top plan view of the fishing jig shown in FIG. 3.
Figure 5:
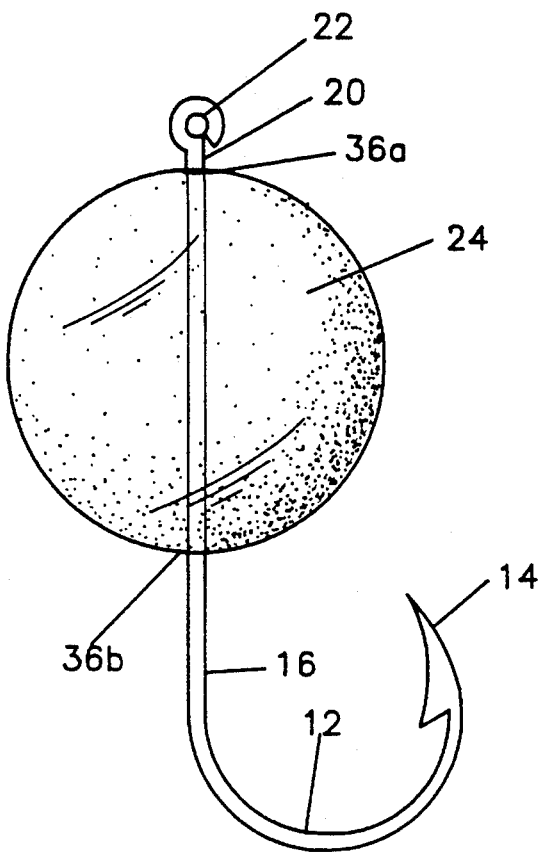
FIG. 5 is a side view of a fishing jig according to a third embodiment of the present invention.

As discussed above, the shaft 18 need not have an L-shaped portion 19 as disclosed in FIGS. 1 and 3, but instead, the shaft 18 may extend 180° from the first end 16 to the second end 20 as shown in FIG. 5. In this preferred embodiment, the sized and shaped throughhole 36 is arranged within the translucent bead 24 to define opposing openings 36a and 36b, respectively. Hook shaft 18 is arranged to extend end-to-end through the passageway 36 as shown in FIG. 5. In this embodiment, it is desirable for the adhesive gap filler 28 to occupy any additional space between the side walls of the passageway 36 and the outer diameter of the shaft 18. Thus, the shaft 18 is securely retained within the translucent head 24 as discussed above. Furthermore, the eyelet 22 is arranged adjacent the translucent head 24 in this straight-hook embodiment shown in FIG. 5, as it is in the other embodiments of the present invention. The preferred shape of the passageway 36 can be best appreciated with reference to FIG. 6 where it is clearly disclosed in a top plan view of the translucent head 24. However, it should be appreciated that the size and shape of the passageway 36 can vary widely without departing from the scope of the present invention.

Figures 6, 7:
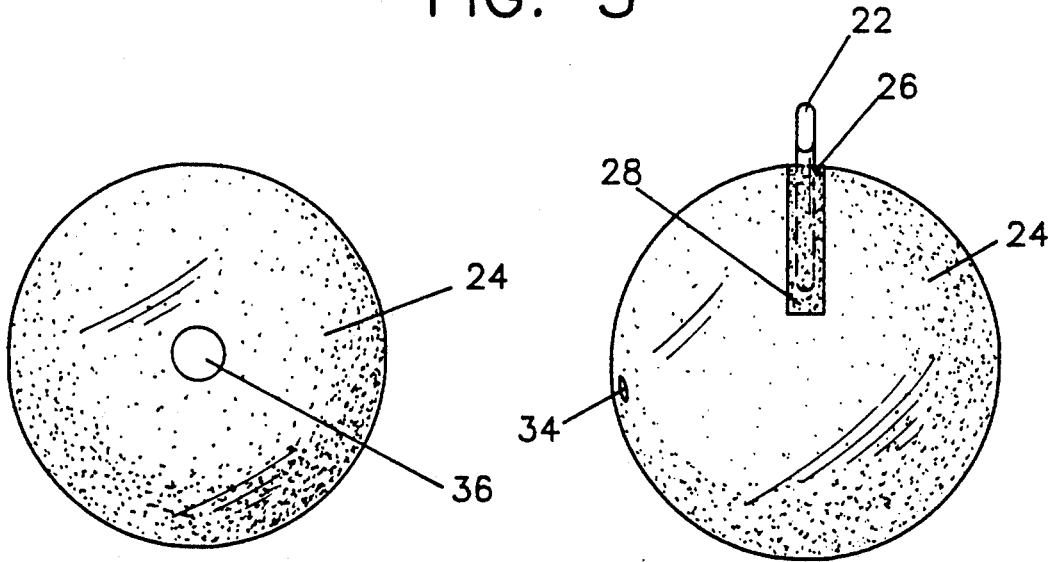
FIG. 6 is a top plan view of the translucent head of the fishing jig shown in FIG. 5 with the hook removed.
FIG. 7 is a front view of the fishing jig shown in FIGS. 1 and 2 with a design displayed thereon.

In yet another preferred embodiment, a design 34 can be drawn, painted or otherwise secured on the translucent head 24 as shown in FIG. 7. This feature of the present invention has both structural and functional advantages as it provides a pleasing aesthetic appearance and effectively projects a magnified image on the opposite side of the translucent head 24.

In operation, the fishing jig 10 is cast into a body of water in the same manner as a traditional fishing jig. Once the jig 10 is arranged in a body of water, reflected sunlight which comes in contact with the translucent head 24 shines therethrough in a manner which is attractive to fish. Additionally, the existence of sediment and the like in the water effectively combines with the sunlight transmitted through the translucent head 24 to give a false appearance that the jig 10 is moving. This feature of the present invention also serves to attract fish in a new and unobvious manner.

Although the translucent head 24 may be made from an entirely clear composition, such as clear glass, it may also be made of colored translucent glass and other translucent materials, both clear and colored. When a glass composition is used, the fishing jig 10 of the present invention will produce an attractive sound when the translucent glass head 24 comes in contact with rocks or other hard objects beneath the surface of the water. This sound serves to attract fish in accordance with the spirit of the present invention.

In accordance with a preferred method of manufacturing the fishing jig 10 of the present invention, an elongate shaft, such as the shaft 18 having a hook 12 and an eyelet 22 thereon, is provided. A translucent bead, such as the translucent bead 24 discussed above, is also provided. Preferably, the manufacturer would then cut a sized and shaped groove 26 in the bead 24 so that the groove 26 can effectively receive the shaft 18 therein thereby providing a translucent bead with a groove therein. Of course, if grooved beads are commercially available, a manufacturer of the present jig may purchase same without exerting efforts to create the grooved portions itself. According to this preferred method of manufacturing a fishing jig 10, the shaft 18 is then placed in the groove 26 so that the bead 24 is arranged to form the head of the jig with the eyelet 22 arranged adjacent the bead 24. It is preferable to then fill the entire groove 26 with an adhesive gap filler 28, such as a translucent epoxy or other suitable resin, so that the shaft 18 is securely mounted therein. A manufacturer of the fishing jig can use his or her discretion as to the precise amount of adhesive gap filler 28 that is required to adequately fill the groove 26.

According to another preferred method of the present invention, the passageway 36 is drilled end-to-end through the translucent bead 24. A hook shaft 18 having an eyelet 22 attached thereto is inserted through the entire length of the passageway 36 so that the eyelet 18 is arranged adjacent the translucent bead 24 at the head of the jig 10. As with the previous embodiment, passageway 36 is then preferably filled with a translucent adhesive gap filler 28 so that the shaft 18 is secured therein, as can be appreciated with reference to FIGS. 5-7. The adhesive filler 28 is then permitted to cure prior to using the jig 10 for any fishing operations.

The method for manufacturing a fishing jig according to the present invention will permit this new and advantageous fishing jig to be quickly and effectively manufactured at a low cost. Thus, the present method will permit the jig 10 of the present invention to be commercially marketed on a large scale basis.

While the foregoing description and figures are directed toward the preferred product and process in accordance with the present invention, it should be appreciated that numerous modifications can be made to each of the individual steps of the method and the components of the fishing jig as discussed above. Indeed, such modifications are encouraged to be made in the steps, materials, structure and arrangement of the disclosed steps and embodiments of the present invention without departing from the spirit and scope of same. Thus, the foregoing description of the preferred steps and embodiments should be taken by way of illustration rather than by way of limitation with respect to the present invention as defined by the claims set forth hereinbelow.

I claim:

1. A fishing jig comprising:
   a shaft having a first end and a second end, said second end of said shaft being L-shaped;
   a hook formed at said first end of said shaft;
   a translucent bead fixedly connected about said second end of said shaft so as to form a head thereon, said translucent bead comprising a groove therein, said L-shaped second end of said shaft being arranged within said groove;
   an eyelet connected to said second end of said shaft arranged adjacent said translucent head.

2. The fishing jig of claim 1 wherein said groove is filled with an adhesive gap filler.

3. The fishing jig of claim 2 wherein said adhesive gap filler is translucent.

4. The fishing jig of claim 1 wherein said translucent bead comprises glass.

5. The fishing jig of claim 1 further comprising weed guard means for preventing said hook from getting caught in underwater plant life.

6. The fishing jig of claim 5 wherein said weed guard means comprises at least one flexible elongate member arranged to extend between a location in said groove adjacent said eyelet and said hook.

7. The fishing jig of claim 1 further comprising bait holder means for retaining bait in a location remote from said hook.

8. The fishing jig of claim 7 wherein said bait holder means comprises a barbed wire, said wire having a first end connected to said eyelet and a second end remote from said hook, said second end being adapted to form a barb thereon.

9. A method of manufacturing a fishing jig comprising the steps of:
   providing an elongate shaft having a hook and an eyelet thereon, said shaft having a head end, said eyelet being arranged at said head end remote from said hook;
   providing a translucent bead with a passageway therein;
   placing said shaft in said passageway so that said bead is arranged at said head of said jig;
   filling said passageway with an adhesive filler so that said shaft is secured therein; and
   permitting said adhesive filler to cure.

10. The method of claim 9 wherein the passageway is a groove and the shaft is L-shaped.

11. The method of claim 9 wherein said step of providing a translucent bead with a passageway therein comprises the step of cutting a groove extending from the outer surface of said bead to a medial portion therein.

12. The method of claim 9 wherein said step of providing a translucent bead with a passageway therein comprises the step of drilling a hole through said bead.

13. The method of claim 12 wherein the step of placing said shaft in said groove comprises the step of sliding said shaft and said eyelet through said hole in said bead until said eyelet is arranged outside of said bead and adjacent thereto.

14. The method of claim 9 further comprising the steps of placing a weed guard at a location in said groove adjacent said eyelet and securing said weed guard to said location and said hook so that said weed guard extends thereacross.

15. The method of claim 9 further comprising the step of attaching a barbed wire to said eyelet so that said barbed wire forms a bait holder at a location remote from said hook.

* * * * *